Dec. 6, 1966   R. B. BUONAIUTO   3,289,253
MOLDS

Filed Jan. 22, 1964   2 Sheets-Sheet 1

INVENTOR.
ROBERT B. BUONAIUTO
BY Kenwood Ross
ATTORNEY.

Dec. 6, 1966   R. B. BUONAIUTO   3,289,253

MOLDS

Filed Jan. 22, 1964                                2 Sheets-Sheet 2

INVENTOR.
ROBERT B. BUONAIUTO
BY Kenwood Ross
ATTORNEY.

United States Patent Office 3,289,253
Patented Dec. 6, 1966

3,289,253
MOLDS
Robert B. Buonaiuto, 3 McLean Parkway, Ludlow, Mass.
Filed Jan. 22, 1964, Ser. No. 339,483
7 Claims. (Cl. 18—47)

This is a continuation-in-part of my copending U.S. patent application Serial No. 188,167 filed April 17, 1962 now Patent No. 3,253,064.

This invention relates to molds and more particularly to molds especially adapted for the molding with high frequency electromagnetic waves (dielectric heating) of articles of foamed polymeric materials.

As disclosed in U.S. Patent No. 2,983,692 dated May 9, 1961, and titled, Preparation of Expandable Ethylenically Unsaturated Polymer Particles and Cellular Product therefrom, expandable polymeric materials, suitable for forming foamed articles, can be prepared from polymers such as polystyrene, polyalkylenes, polyacrylic esters, and the like by incorporating therein a volatile substance such as a lower aliphatic hydrocarbon, e.g., pentane.

The expandable polymeric materials, generally provided in the form of beadlets, are formed into an article of low density integral cellular structure by heating the beads in a mold to cause same to soften and expand within the mold confines into a fused polymer of foamaceous nature.

As is known, the density of the molded article can be controlled within limits by pre-expanding the beadlets by methods and in apparatus well known to the art.

As disclosed in U.S. Patent No. 2,998,501 dated August 29, 1961, high frequency electromagnetic waves can be used for the expansion of the beadlets, if, prior to their introduction into the mold, they are covered with a material with a high loss factor, such as water preferably containing a suitable surfactant. The beadlets, being transparent to radio frequency heat, dictate the addition of a moisture content thereto so that they will be rendered receptive to said heat. The moisture picks up the radio frequency heat, and, in turn, evolves into the steam to produce the desired foaming function.

When dielectric heating is so employed for beadlet expansion, the mold must, obviously, be of a material having a low less factor and additionally having sufficient strength and rigidity to withstand the not inconsiderable internal pressure which is built up by the expansion of the beadlets.

Materials which have been used in the past for molds to be used in connection with dielectric heating have included polypropylene, glass fiber-reinforced polyester and epoxy resins, polytetrafluoro ethylene, and the like.

All of the molds employed to date for use in connection with high frequency heating methods have failed to provide foamed plastic articles with an exterior surface in which the beadlets forming the surface are completely expanded and fused together. That is, the surface of the molded article is generally of a rough nature which is incapable of delineating fine detail.

Additionally, when made in molds of the foregoing character, the foamed plastic articles, if they possess sharp edges of corners or the like, are friable or crumbly in such areas because of the incomplete expansion and imperfect fusion of the beadlets.

It is an object of this invention to provide molds which, when employed with dielectric heating, will provide foamed articles that are free of such rough surfaces and crumbly edges and corners.

Stated in another way, this invention has particular concern with mold constructions employed in the expanding or foaming of thermoplastic resinous materials into molded shapes whereby the formed articles obtained therewith have not only uniform cores of cellular polymeric or foam plastic material but also outermost skins or surfaces which are equally uniform, tight and non-crumbling.

Another object hereof is to provide methods for constructing molds allowing the aforesaid desirable characteristics to be attained.

A mold constructed in accordance with this teaching is characterized by the provision on its inner surface of a relatively thin stratum or layer or minutely porous or foraminous nature. The porous stratum may be composed of the same material as is employed for what might be termed the body of the mold, but more conveniently is composed of a different material because of the difficulty encountered in manipulating a composition in such manner as to form a mold constituted by an impervious body with a thin surface stratum of pervious nature.

The mold is characterized in that it comprises a mold body, normally constituted of separable sections which, if desired, may be equipped with engageable fittings for holding the sections together in cavity-enclosing relationship in the operative position, with a cavity being bounded by a working or molding surface of porous nature.

The porous layer or stratum can be composed of any material which is relatively heat resistant and has a low power loss. The porous layer can take the form of a lining of woven cloth, preferably glass cloth, or untreated paper, cardboard, or like materials. However, there are disadvantages to the use of such materials since because of their nature they cannot be made to conform to complexly shaped articles and therefore their use is limited to the production of articles of simple linear form. Additionally, the above-mentioned materials, except the glass cloth, become burned upon repeated subjection to high frequency current, and hence, although they can be used for experimental purposes, they are not suitable for long production runs.

The porous layer can be composed of porous stone or stone-like material. However, here again because of the difficulties encountered in the fabrication of mold forms of such materials, although they are operative, they do not represent the preferred materials.

The presently preferred porous layer is composed of a thin layer of flock which is partially embedded in and securely held by the rigid material forming the body or backing of the mold. The flock lining can be formed from natural fibers, including mineral fibers such as asbestos, or can be formed from synthetic fibers.

The fibers selected should be resistant to the temperature rise attending the molding operation, and should be of inert character so that they do not bond chemically or physically with the polymeric material being expanded. Furthermore, the fibers should be of such character that they have a low loss factor and withstand repeated subjection to dielectric heating without deterioration. Among the various materials which can be used, I have found nylon fibers to be the presently preferred fibers for foaming the porous layer.

For purposes of reference, let it be understood that a porous material as the term is used herein will be understood to mean a solid containing frequently occurring interconnected minute holes or voids, dispersed therewithin in either a regular or random manner, to allow a fluid to flow through the effective pore space (i.e., the interconnected pore space) or that portion of the entire pore space termed the total pore space.

My improved mold comprises a plastic mold body, which is lined, at least in the stratum immediately underlying and including the molding surface, with porous material in the form of a coherent porous mass.

For best efficiency of the mold, the minutely porous structure of the stratum need not extend to any substantial depth below the molding surface of the mold, it being sufficient to provide a porous stratum only immediately underlying the molding surface of the mold.

The molds hereof envision novel mold constructions of an electrically non-conductive material, of a rigidity so as to be self-sustaining and to withstand the pressures evolved in the expanding process, and of a design and configuration as to be incorporated with or clamped to other structures.

Such molds are especially adapted for employment in a radio frequency system; are thick enough to be mechanically strong for restraining bead gas pressure; have a low dielectric loss; are easily fabricated; have a heat distortion temperature of over 200° F.; have a low coefficient of linear expansion; are easily machineable or otherwise workable; are arc resistant; wear usable for thousands of cycles; are resistant to chemical additives used on the beads and non-adhering to the foamed polymeric material; and are adherable to suitable reinforcing materials.

To enable other skilled in the art so fully to comprehend the underlying features hereof that they may embody the same in the various ways contemplated by this invention, drawings depicting preferred typical constructions embodied in concrete form have been annexed as parts of this disclosure, and in such drawings, like characters of reference denote corresponding parts through all the views, of which:

Figure 1:
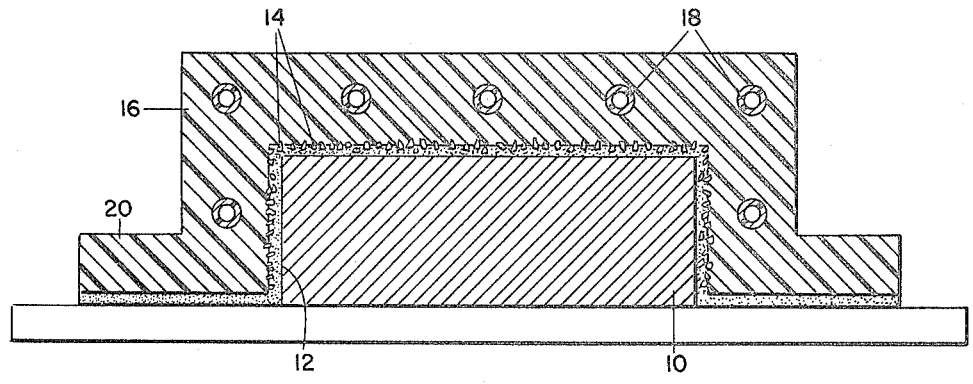
FIG. 1 illustrates one form of mold, in half vertical section, in an early stage of its construction.

It will be understood to those skilled in the molding art, that of the several processes to be described hereinafter, the particular process selected will depend upon whether the article itself is to be reproduced, or whether a complementary form of the article is to be produced such as will be used for a shock-resistant shipping container. Additionally, it will be understood that for the sake of simplicity the drawings and description portray the construction of but a single mold half or section rather than the plurality of such which are required for the molding operation.

In one method of producing a mold in accordance with this invention, a primary investment film 12 formed from a solidifiable viscous material is applied to and coextensive with the appropriate surfaces of the pattern of an article 10 as by the brushing thereof or by the spraying thereof with a point-type spray gun.

While the pattern 10 is shown in the instant disclosure as comprising a rectangular body, it will be understood that the shape of the pattern will vary according to the article to be molded and that the pattern shown is of simplified form for purposes of illustration only. If desired and practiced, the article itself may constitute the pattern.

A variety of materials can be used as the investment film. The film-forming material should be one that is readily solidifiable either through evaporation of a solvent in which it is dispersed or by gelling by heat or cold or other means, or by a setting process or polymerization. It should be a material in which neither the mold backing nor the flock is soluble, and it should be of such character that it can readily be dissolved or otherwise removed without harm to the flock or mold backing. Presently preferred materials include polyvinyl alcohol, gelatin and agar which are employed in the form of concentrated aqueous solutions. Other materials suitable for use include hydrocarbon solvent solutions of waxes and collodion. Additional materials which can be used as investment films will readily suggest themselves to those skilled in the art.

After the pattern surfaces have been thoroughly coated with the primary investment material, and while the coating is still in the wet or fluid state, the conditioned surfaces are thoroughly covered, for example as by sprinkling or by flocking gun, with flock 14 having fibers averaging ¼ mm. to 1 mm. in length and with a diameter of about 15 to 30 denier, so as to randomly direct onto the wet film a spray of the flocking material and form a layer or stratum thereof.

The sprinkling of the wet pattern with the plastic particles is termed "sanding." After the wet pattern has been thoroughly "sanded," the excess particles are shaken or gently blown off and the coated and "sanded" pattern is allowed to dry. The particles, as applied to the surface of the liquid coating penetrate the coating to varying depths, and when the coating has solidified are thus effectively bonded in place.

A sufficiency of flocking material is sprayed thereonto to cover the surface of the primary investment film as a strawlike agglomerate with certain of the flocking material having penetrated the body of the film to be held thereby. The film 12 is thereafter allowed to dry and harden so as to take on the aspect of a thin plastic film with a layer of flock 14 partially embedded therein.

After air-setting of the coated and "sanded" pattern, the primary coating consists of a somewhat "roughened" exterior surface brought about by the bonding and drying of the particles on its surfaces. The roughened surface interlocks with the secondary investment composition forming the body of the mold, effectively to bond or anchor the coating in place, as will appear. Moreover, the "sanding" operation assists in fixing the coating in place by preventing a drainage or flowing thereof along the surface of the pattern, for example from the high points of the pattern.

The use of a finely comminuted flocking material produces a smooth coating which results in a casting having a high degree of surface smoothness and possessing the maximum of detail present in the pattern itself.

There following, a secondary investment or backing layer 16 is sprayed or otherwise applied onto the flocked surface of the film, comprising a layer of a rigid material with a low loss to high frequency electromagnetic waves, such as polyester resin reinforced with chopped glass fiber reinforcing strands, or an epoxy resin reinforced with sand.

The backing layer 16 functions to give a desired strength and rigidity to the formed mold, and for such purpose a variety of materials can be employed in addition to the polyester and epoxy resins mentioned above.

The backing layer is applied as by spraying, as aforesaid, or can be applied by other suitable methods, as by pouring or casting within a mold. The thickness of the backing layer is determined by the size of the part and/or the cavity, and by the anticipated pressure within the mold.

Gussets or webs or ribs, formed of the same or different material as the backing layer may be employed to build up strength. The said gussets or webs or ribs may be interlocking or crossed as in casting so as to allow less mass and therefore less heat absorbed by the mold per se.

Cooling tubes 18 can be incorporated into the backing layer and such are generally desirable for molds used in production runs. Polyethylene tubing or other similar tubing can be employed for the cooling tubes.

Figure 2:
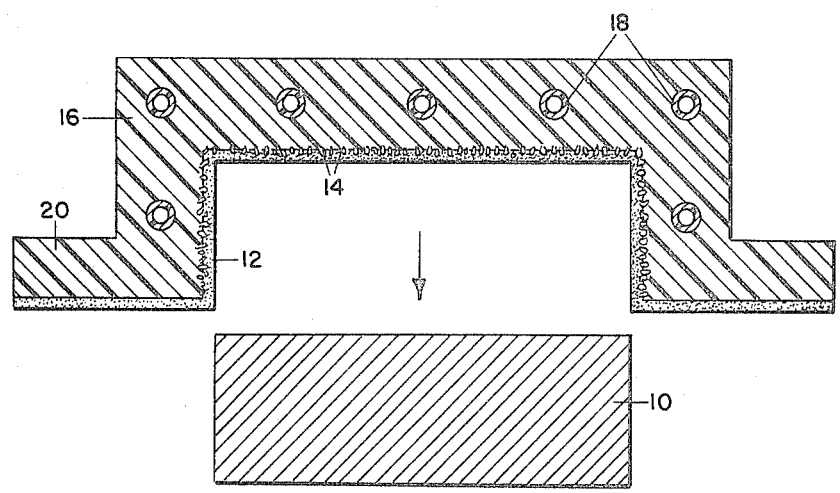
FIG. 2 illustrates the mold of FIG. 1, in a subsequent stage of its construction.

There following the pattern is pulled away from the formed structure, as shown in FIG. 2, thus forming a structure comprising a film, layer of flocking, and backing layer.

Figure 3:
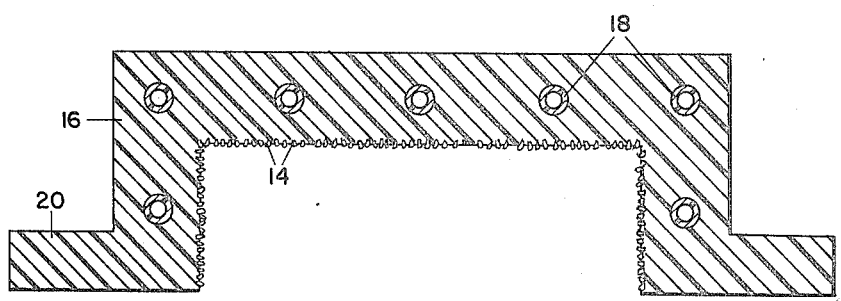
FIG. 3 illustrates the mold of FIG. 1 in its completed stage.
Figure 4:
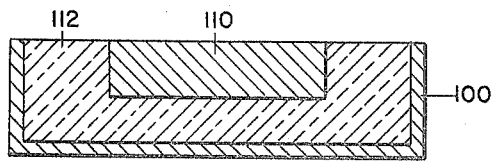
FIGS. 4–9 illustrate another form of mold in half vertical section in progressive stages of its construction and completed form.
Figure 5:
Figure 6:
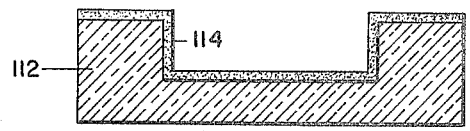
Figure 7:
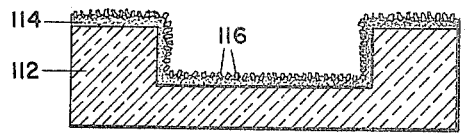
Figure 8:
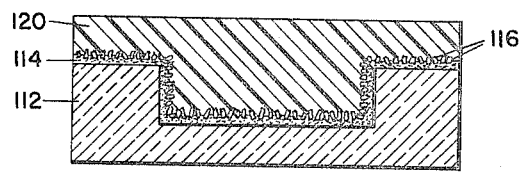
Figure 9:
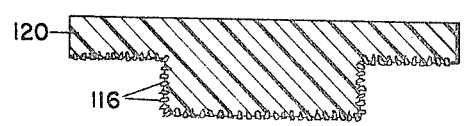

Film 12 is then removed as by spraying thereon or as by immersing the structure within a container of a suitable solvent for the film for the purpose of dissolving the film 12 so as to modify the formed structure to one constituted by a layer of flocking 14 and a backing layer 16, as shown in FIG. 3, the flocking being partially embedded in the backing.

Thereby the formed face of the mold is comprised of the now exposed fibers of flock to serve the desired function of offering porosity to the surface.

Contrariwise, the process can be carried out in reverse, wherein a backing layer of low-loss rigid material is first formed around a form. Following the removal of the form, the interior of the form is brushed or sprayed with a thin layer of adherent material, and while the layer is still in its fluid state it is sprinkled with flock thereby to permit the flock partially to embed itself in the layer. Upon the hardening or setting of the layer, there results a mold having a porous molding surface. Illustratively, the mold backing is made of polyester resin or epoxy resin suitably reinforced as with glass fibers. The interior surface of the mold backing is then sprayed with a thin coating of polyester resin and the coating is sprinkled with nylon flock and the resin allowed to set, thereby securing the partially embedded flock layer to the mold backing.

The mold body shown in FIG. 3 will additionally be observed to comprise an upper portion with an outwardly extending flange 20 which may be clamped to the flange of a similarly formed lower portion (not shown) by means of clamps or equivalent.

The inner or cavity-defining wall of said upper portion will be observed to be impregnated with an anti-adhesive material which penetrates into a stratum immediately underlying said molding surfaces thus forming a porous molding surface.

According to the invention, while the plastic materials used to constitute the mold are of anti-adhesive nature, said material has functions specifically different from those of a conventional release agent applied on the non-porous surface of molds to originate a very smooth molding surface, and, consequently, to facilitate the detachment of the molded article from said surface.

Although I do not wish to be bound by any particular theory of operation, it would appear that the porous stratum provides for the escape from the mold of occluded air, gas and steam, and more importantly, contributes to the thorough heating and consequent expansion and fusion of those beadlets which contact the molding surface.

Because low-loss material employed in mold construction for dielectric heat molding remains relatively cool, unlike the metal molds used in the steam process, the steam which comes into contact with the molding surface is condensed and the condensed water is not readily reconverted into steam because of the continued cooling effect of the molding surface. However, with molds constructed in accordance with this invention, such steam as is condensed into water upon contact with the porous molding surface is readily regenerated into steam because the porous layer serves as an insulating barrier thus permitting the regeneration of a layer of live steam at the periphery of the porous surface, and thereby creating in effect a heated molding surface which results in a complete expansion and thorough fusion of those beadlets coming in contact with it.

An alternative method of forming a mold having the characteristics of the molds of this invention comprises the initial formation from a substance of a resilient material of a pattern prepared from the article whose contour and shape are to be duplicated. This method is used to form a shipping or packaging container having a surface complementary to the configuration of a customer's article requiring delicate handling.

The material employed can be one which is applicable in liquid form over the surface area of the article to be duplicated so as to conform exactly to the configuration of the said article, and which liquid will then set, gel or polymerize to an elastic or nearly so body which can be stripped from the article without distortion of the article's imprint. The resilient body is then coated with a suitable viscous investment material capable of solidifying as described hereinabove, and prior to hardening is "sanded" with flock. Thereafter, a mold backing of a character as earlier described herein is built up upon the "sanded" resilient pattern to complete the formation of the mold part. The resilient pattern is then stripped from the mold, and the investment material is removed, as by an appropriation solvent thereby producing a mold part with a porous stratum defining its molding surface.

Illustratively, the above-described process can be carried out as follows:

Gelatin and water are heated to a temperature in the area of 225° F., to dissolve the gelatin, and the heated mixture is poured into a container 100 containing a body 110 which may be the customer's article.

The gelatin sets and gels to form a flexible solid mass 112 and may then be stripped off so as to produce an exact replica of the outer configuration of the article. The solidified gelatinous mass is then painted or sprayed with a coating of aqueous polyvinyl alcohol 114, the same being compatible with the gelatin, or alternatively the surface of the gelatin is carefully moistened with water to soften it, and immediately there following the coated or moistened surface is flocked with nylon flock to form a layer 116.

There following a backing layer 120 of glass fibers and polyester is laid thereover. When this is set up and hard, the gelatin is stripped off.

It will be appreciated that the flock coating has been transferred to the polyester and is partially embedded in it, thus forming a porous stratum as the molding surface. In the event an investment has been employed it will, of course, be necessary to remove the film to expose the flock.

I claim:

1. A rigid mold constructed of an impervious material having a low-loss factor for high frequency electromagnetic waves and being coated on its molding surfaces with a fibrous material, a portion of the fibers being embedded in the substance of the mold and a portion of the fibers being free.

2. In the mold as defined in claim 1 and having a cavity therein.

3. In the mold as defined in claim 1 and being formed of a plastic material.

4. In the mold as defined in claim 1, the fibers being formed from a low-loss-factor heat-resistant material.

5. In the mold as defined in claim 1, the fibers being formed from a low-loss-factor flock material comprising mineral fibers.

6. In the mold as defined in claim 1, the fibers being formed from nylon flock.

7. In the mold as defined in claim 1, the fibers being foam from a low-loss factor heat-resistant material having substantially inert chemical and physical properties with respect to the articles being formed therewithin.

References Cited by the Examiner

UNITED STATES PATENTS

| | | | |
|---|---|---|---|
| 851,849 | 4/1907 | Willey | 264—219 |
| 2,345,939 | 4/1944 | Leary | 264—338 X |
| 2,363,213 | 11/1944 | Wallace | 18—47 |

(Other references on following page)

UNITED STATES PATENTS

| | | | |
|---|---|---|---|
| 2,560,599 | 6/1951 | Ryan | 18—47 X |
| 2,626,428 | 1/1953 | Bosomworth | 18—47 X |
| 2,707,801 | 5/1955 | Gard | 18—47 X |
| 2,707,802 | 5/1955 | Gard | 18—47 X |
| 2,842,801 | 7/1958 | Walkey et al. | 18—5 |
| 2,948,651 | 8/1960 | Waag | 264—45 X |
| 2,967,756 | 1/1961 | Mazzucchelli et al. | 18—47 |
| 3,064,314 | 11/1962 | Gagene et al. | 264—219 |
| 3,165,567 | 1/1965 | Olson | 264—338 X |

OTHER REFERENCES

Epoxy Tooling for Shot Runs, American Machinist, Sept. 30, 1963, pp. 64–66.

Flock Finishing, Behr Manning Co., 1949.

J. SPENCER OVERHOLSER, *Primary Examiner.*